Patented Nov. 15, 1938

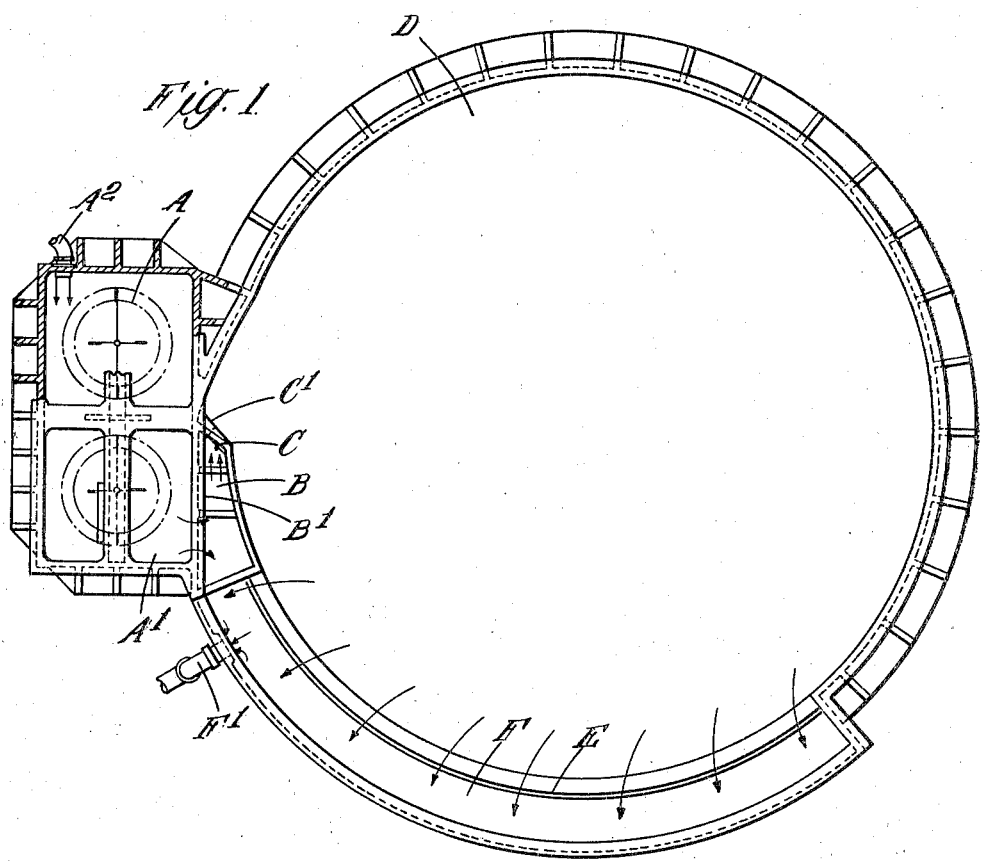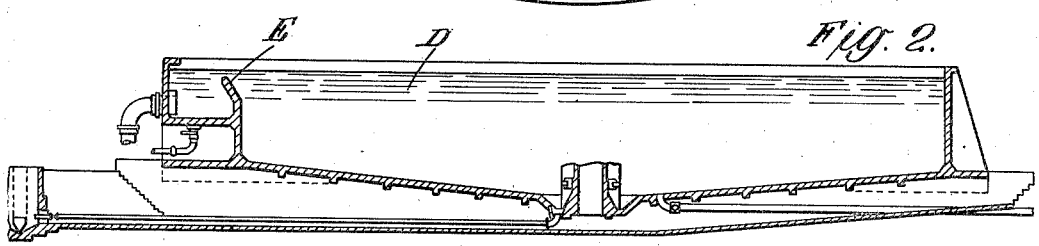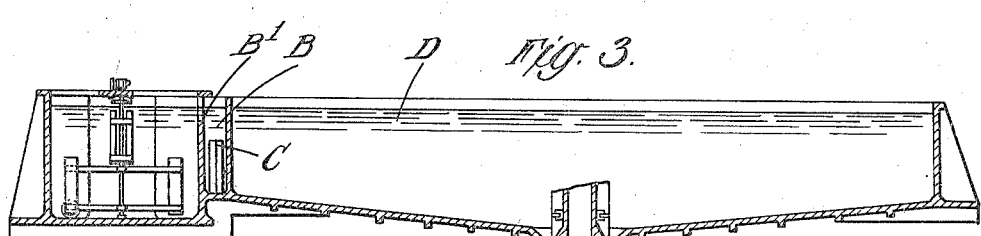

2,136,903

UNITED STATES PATENT OFFICE 2,136,903

SEDIMENTATION APPARATUS OR THICKENER

Edwin William Arnold Humphreys and Percy Harry Illingworth Humphreys, London, England, and Thomas Dow Key, Alexandria, Egypt, assignors of one-half to said Key and one-half to Robert Walton, Alexandria, Egypt Application September 1, 1936, Serial No. 98,872
In Great Britain February 3, 1934

1 Claim. (Cl. 210—3)

This invention relates to sedimentation basins or thickeners and similar apparatus such as is used for example for the purification of water, sewage treatment, separation of industrial waste, thickening substances containing liquids, wet treatment of metalliferous ores and slimes, treatment of cement slurries and whitening and chemical slurries, treatment of pigments, and for industrial recovery plants.

Various types of sedimentation basins are in use in water purification plants and sewage treatment plants. The liquid introduced into the basin is intended to pass slowly through the basin from the inlet to the outlet and remaining in the basin for a sufficient time for example four to eight hours to enable solid matter (usually floc resulting from the action of chemicals introduced into the liquid on impurities in the liquid) to settle on the floor of the basin. It has been found in practice however that part of the liquid introduced into the basin will not infrequently reach the outlet in a very short time— much too short to enable the floc to settle—with consequent inefficiency. In experiments colouring matter has been introduced into the liquid at the inlet and has been found to reach the outlet in considerable quantities in about 20 minutes or so. One common type of basin has an inlet for the liquid at the centre and an outlet comprising a weir for escape of the liquid around the whole circumference of the basin so that the principal direction of flow is radially outwards from the centre. Another common type of basin has a weir or orifice inlet in one side of the circumferential wall and the outlet is a weir for free flow occupying a portion of the opposite side of the circumferential wall and in this arrangement the direction of free flow is diametrically across the basin. In a third common arrangement the liquid is introduced by a weir or pipes or orifices at the peripheral wall and escapes through a central outlet in which arrangement the direction of flow is mainly inwards towards the centre. Probably the greatest obstacles to uniformity of flow with consequent inefficiency are due to the short circuiting of the liquid caused by differences in temperature, eddies, and by any substantially stationary mass of water in any part of the basin.

An important object of the invention is to obtain greater uniformity of flow of the liquid through the basin so as to enable the actual period of detention of the bulk of the liquid in the basin to approach the theoretical maximum.

According to the invention the liquid is introduced into the basin in such a direction as to cause the liquid to rotate slowly about the vertical central axis of the basin and the outlet of the liquid is arranged to occur from the uppermost layer thereof. In small basins the surface tension of the liquid assisted by floc or dust forms a skin or thin layer which will probably not be moved and will not escape through the outlet. It is to be understood that in such circumstances this fixed layer is not what is intended above by the term "uppermost layer". The term "uppermost layer" is intended to refer to the uppermost layer of liquid capable of decanting. Preferably the circulation of the liquid will occur without interruption, that is, to say, the basin will not be provided with piers or other parts which will interrupt the flow of the liquid with the exception that a rotary sediment moving or scraping device may be employed as will hereinafter be described. The liquid is preferably introduced at or near the bottom of the basin and the outlet is preferably arranged so that only the top layer of the liquid in the basin can escape through the outlet. The outlet is preferably arranged in such a manner as to avoid or minimize the objectionable Borda orifice effect which has previously been troublesome owing to the upward flow of liquid near the outlet drawing the settled matter off the bottom of the basin. The outlet accordingly may comprise a weir at the periphery of the basin extending from adjacent the inlet in the opposite direction to the direction of inflow of liquid around the periphery for a suitable distance (say 120°). The liquid in the basin must be permitted to rotate freely and must not be obstructed by baffles, piers or other means and if for example a rotary sludge removing device is employed this will be slowly rotated in the same direction as the direction of rotation of the liquid and may be actually rotated by the liquid and the device may be provided with blades or webs to provide sufficient area for the action of the water to cause rotation.

When the entrant liquid contains a floc which is required to settle in the basin the liquid will preferably be introduced into the basin at a suitable angle (for example 45° to the tangential) so that the inflowing liquid impinges against the liquid which has already rotated at least once around the basin whereby floc which has already travelled at least once around the basin will collide with incoming floc and will adhere thereto, the advantage being that the agglomerations of floc tend to settle more readily. The angle at which the liquid is introduced may vary according to circumstances from the tangent up to about 85° to the tangent. The weir is preferably submerged, that is to say, the liquid on both sides of the weir is above the upper edge of the weir. The wall, plate, or baffle, comprising the weir preferably is inclined from its upper edge downwards for part of its depth towards the centre of the basin the angle of inclination being for example about 30°. The depth of the inclined portion and the angle of inclination and other dimensions will be suitably co-related or selected to avoid the objectionable Borda orifice effect and so as to permit the top layer only of the liquid in the basin to flow over the weir. We have found that coloring matter placed a few inches below the top of the liquid will move parallel to the weir and only when the coloring matter is laid on the very top surface of the liquid will it decant over the weir. The effluent enters a chamber which preferably is provided with a horizontal outlet which tends to avoid the vortex effect which appears to occur with an outlet pipe placed vertically at the bottom of the chamber. Before passing the liquid into the basin it may be passed through conditioning tanks in which the floc is caused to agglomerate. A number of basins with their associated conditioning tanks may be arranged in parallel and the outlet weirs may be arranged on the same compass point side of two or more basins to neutralize wind effects. The inlet to the basin may be provided with adjustable gates or other means whereby the size, position or direction of the inlet may be varied.

Various modifications are possible without disturbing the uniformity of flow; for example if a central outlet is desired this will require to be arranged to avoid the Borda orifice effect and for this purpose a horizontal plate may be provided at the centre of the basin which is just below the surface of the liquid. For example a layer of liquid say of one eighth of an inch depth may cover the plate. The plate will form a submerged or free flow weir over which the liquid flows to the outlet which may be in the centre of the plate. The surface of the plate may be lower from its periphery to its outlet and may accordingly be of frusto-conical shape or bell-mouthed. Alternatively the central weir outlet may be inclined similarly to the wall E in which construction the upper part of the central weir will be tubular and of frusto-conical shape with smaller end uppermost.

In order that the said invention may be clearly understood and readily carried into effect, the same will now be described more fully with reference to the accompanying drawing, in which—

Figure 1 is a plan view of a sedimentation basin with associated conditioning tanks;

Figure 2 is a sectional view of the basin shown in Figure 1 illustrating more particularly the outlet weir;

Figure 3 is another section of the basin shown in Figure 1 illustrating more particularly the inlet opening.

In Figures 1, 2 and 3, A, $A^1$ are conditioning tanks from which liquid enters a chamber B over a submerged weir $B^1$ and escapes from this chamber through the inlet opening C into the sedimentation basin D, this opennig being controlled by adjustable gates $C^1$ and being arranged to introduce liquid into the basin at an angle of 45° to the tangential. The outlet weir E permits outlet of liquid into the chamber F from which the liquid is drawn off by horizontal outlet pipe $F^1$. The weir E is submerged and inclined as shown in Figure 2. The diameter of the basin is about 110 feet and the other parts are roughly drawn to scale.

The basin may be circular, rectangular with rounded corners, or of other desired shape.

What we claim and desire to secure by Letters Patent of the United States is:

Sedimentation apparatus for flowing liquids, comprising a sedimentation basin having a peripheral wall, said wall having an inlet port therein in the form of a vertically elongated slotted opening with the lower end of the slotted opening substantially registering with the bottom wall of the basin, said inlet port being directed into the basin to one side of the vertical axis thereof and outlet means at the uppermost portion of the periphery of said basin including a submerged weir at the periphery of the basin consisting of a downwardly extending inclined wall portion merging into a perpendicular wall portion with the inclined wall portion set at an angle of approximately 30° at least along a part of its depth toward the center of the basin.

EDWIN WILLIAM ARNOLD
        HUMPHREYS.
PERCY HARRY ILLINGWORTH
        HUMPHREYS.
THOMAS DOW KEY.